United States Patent
Hübner

(10) Patent No.: US 11,885,367 B2
(45) Date of Patent: Jan. 30, 2024

(54) SPINDLE NUT

(71) Applicant: PHYSIK INSTRUMENTE (PI) GMBH & CO. KG, Karlsruhe (DE)

(72) Inventor: Reinhard Hübner, Waldbronn (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 377 days.

(21) Appl. No.: 16/764,316

(22) PCT Filed: Nov. 15, 2018

(86) PCT No.: PCT/DE2018/100935
§ 371 (c)(1),
(2) Date: May 14, 2020

(87) PCT Pub. No.: WO2019/096354
PCT Pub. Date: May 23, 2019

(65) Prior Publication Data
US 2020/0340517 A1    Oct. 29, 2020

(30) Foreign Application Priority Data
Nov. 16, 2017    (DE) .................... 10 2017 126 963.0

(51) Int. Cl.
F16B 39/10    (2006.01)
F16B 39/12    (2006.01)

(52) U.S. Cl.
CPC .............. *F16B 39/10* (2013.01); *F16B 39/12* (2013.01)

(58) Field of Classification Search
CPC ....... F16B 39/00; F16B 37/002; F16B 37/005
(Continued)

(56) References Cited

U.S. PATENT DOCUMENTS

| | | | | |
|---|---|---|---|---|
| 954,304 | A | * | 4/1910 | Kenney .................. H04W 76/12 455/450 |
| 3,208,493 | A | * | 9/1965 | Holmes .................... F16B 39/32 411/948 |

(Continued)

FOREIGN PATENT DOCUMENTS

| | | |
|---|---|---|
| DE | 102012110986 A1 | 5/2013 |
| DE | 102015214824 A1 | 2/2017 |
| EP | 3205904 A1 | 8/2017 |

OTHER PUBLICATIONS

International Search Report, PCT/DE2018/100935, date Apr. 24, 2019, 2 pages (in English).

(Continued)

*Primary Examiner* — Gary W Estremsky
(74) *Attorney, Agent, or Firm* — The Juhasz Law Firm

(57) ABSTRACT

Spindle nut which can be brought into engagement with or engages with a corresponding spindle, wherein the spindle nut comprises an internal thread which is defined by three longitudinal grooves, which run in a direction parallel to a central thread axis A of the spindle nut, which is interrupted, as a result of which three spaced-apart internal thread segments are formed in the spindle nut, and, in case the spindle nut is in engagement with the spindle, the external thread of the spindle is in contact only with the internal thread segments, wherein the spindle nut, with respect to a cross section arranged perpendicular to its central thread axis A, comprises a cross section geometry with an inner cross-section curve K facing the central thread axis, wherein at least the inner thread segments each form a partial circle shaped section of the cross section curve K, wherein the diameter of each partial circle shaped section corresponds to the core diameter of the internal thread, and the partial circle shaped sections of the cross-section curve K are connected via transition sections to longitudinal groove sections of the (Continued)

Figure 1:
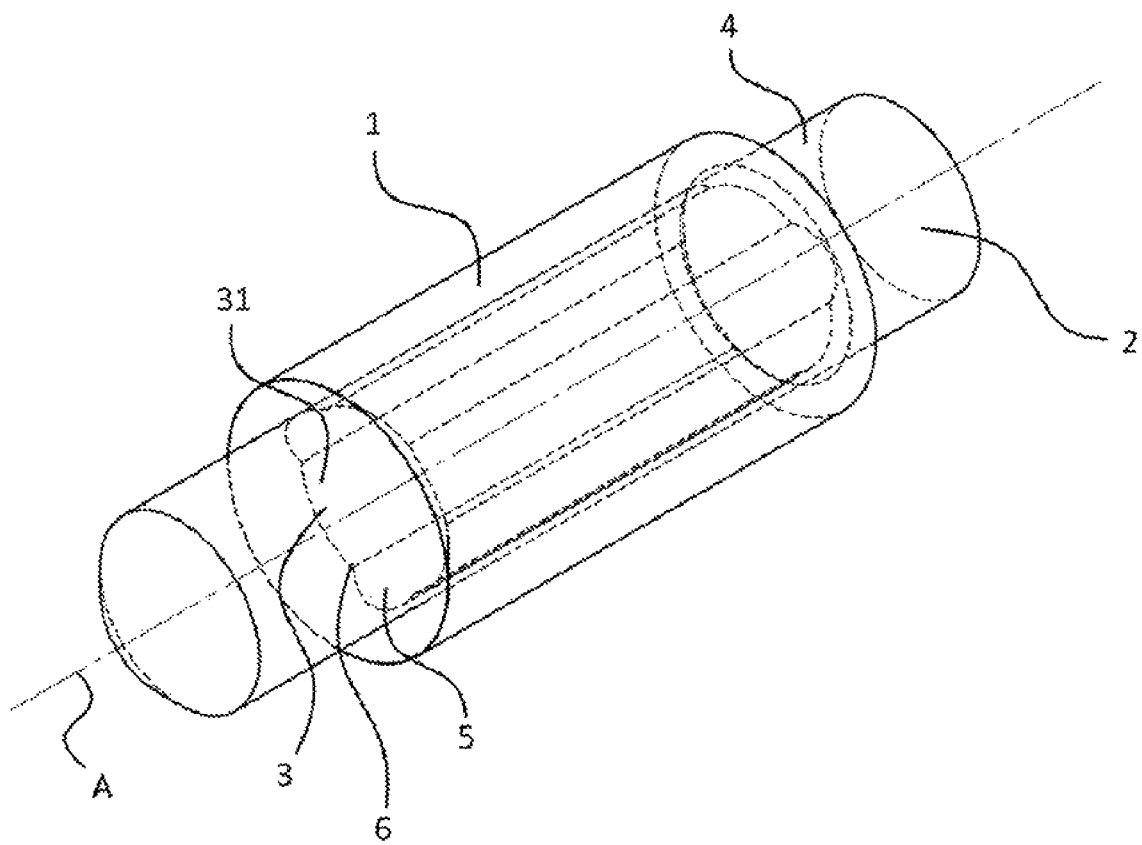

cross section curve K which are formed by the longitudinal grooves, wherein a distance a between the two transition sections adjoining a longitudinal groove section is smaller than a distance b between the two transition sections which adjoin a partial circle shaped section.

18 Claims, 2 Drawing Sheets

(58) Field of Classification Search
USPC .............................. 411/120, 437; 74/424.94
See application file for complete search history.

(56) References Cited

U.S. PATENT DOCUMENTS

| | | | | |
|---|---|---|---|---|
| 3,841,371 | A * | 10/1974 | Thurston | F16B 39/284 |
| | | | | 411/937 |
| 4,790,203 | A * | 12/1988 | Brandenstein | F16H 25/24 |
| | | | | 74/89.36 |
| 5,772,373 | A * | 6/1998 | Cronin, II | F16B 39/108 |
| | | | | 411/948 |
| 6,206,620 | B1 * | 3/2001 | Burns | B23G 5/04 |
| | | | | 470/10 |
| 6,406,338 | B1 * | 6/2002 | Endo | H01R 13/055 |
| | | | | 29/874 |
| 7,179,036 | B2 * | 2/2007 | Griffin | F16B 33/006 |
| | | | | 411/416 |
| 7,927,052 | B1 * | 4/2011 | Varden | F16B 39/108 |
| | | | | 411/197 |
| 8,326,308 | B2 * | 12/2012 | Zaus | H04W 76/12 |
| | | | | 455/450 |
| 10,905,476 | B2 * | 2/2021 | Lopez | A61B 17/8057 |
| 2007/0286700 | A1 * | 12/2007 | Ladouceur | B21K 1/68 |
| | | | | 29/412 |
| 2012/0014764 | A1 * | 1/2012 | Davidson | F16B 37/002 |
| | | | | 411/437 |
| 2014/0223954 | A1 * | 8/2014 | Shimada | F25B 9/14 |
| | | | | 62/470 |
| 2018/0291955 | A1 * | 10/2018 | Rode | F16C 35/063 |

OTHER PUBLICATIONS

Written Opinion of the International Searching Authority, PCT/DE2018/100935, dated Apr. 24, 2019, 7 pages (in English).
Translation of Office Action of the German Patent Office, dated Jul. 25, 2018, DE Application 10 2017 122 963.0, Filed Nov. 16, 2017 (2 pages).

* cited by examiner

SPINDLE NUT

The invention relates to a spindle nut according to claims 1 to 6, and the use of such a spindle nut in a motorized actuator according to claim 7.

From DE 10 2012 110 986 A1, a thread arrangement is known in which a spindle or a screw comprises an interrupted, non-continuous external thread and thus only partially projecting thread sections are disposed along the circumference. The corresponding nut is designed correspondingly complementary and comprises an internal thread interrupted by longitudinal grooves, wherein the number of longitudinal grooves of the nut correspond to the number of projecting threaded sections of the spindle. In this way it is possible to push the screw far into or through the nut if the projecting threaded sections of the screw are positioned relative to the nut-shaped recesses of the nut such that a mutual overlap results. After the screw has been inserted into the nut, a slight rotation of the screw is then sufficient to achieve a thread engagement over the entire length of the nut in the axial direction, so that a secure screw connection results in a very rapid manner. The aim of the thread arrangement of DE 10 2012 110 986 A1 is primarily a significantly reduced assembly time for producing a thread engagement, for example between a spindle and a spindle nut.

Similarly, from the general state of the art, breeches of guns are known in which an internal thread arranged in the gun housing is interrupted by groove-shaped recesses which extend along the longitudinal direction of the gun housing, so that the internal thread is divided into a plurality of internal thread segments, and in which a breech element which is to be inserted into the gun housing and which is to seal the gun housing has a complementary shape with corresponding external thread segments.

To close or seal the gun housing for firing a projectile, the breech can be inserted very quickly into the gun housing by its external thread segments being arranged or coming to lie in the areas of the recesses of the internal thread of the gun housing, so that an axial movement of the breech part in the gun housing without a relative rotational movement between the breech and the gun housing—as is usually the case when screwing a screw into a thread—is made possible.

By subsequent, only slight rotation of the breech inserted into the gun housing, the remaining threaded sections of the external thread segments engage the threaded sections of the internal thread segments, resulting in a quick fixation of the breech block, which results the enormous pressure inside the gun barrel when the projectile is fired, which pressure acts in particular in the axial direction and thus tries to drive the breech out of the gun housing.

From DE 10 2015 214 824 A1 a spindle drive is known in which either the spindle or the spindle nut comprises at least one longitudinal groove which serves as a depot for receiving a lubricant.

The applicant has surprisingly recognized that an increased positional stability of the spindle against transverse forces attacking the same results, when the thread of a spindle engages the thread of a spindle nut, with the spindle itself having a continuous thread or full thread and the spindle nut having a triple interrupted or subdivided thread. In addition, the applicant has recognized that in particular the use of a spindle nut according to the invention in an adjustment device, preferably in a precision adjustment device in which a spindle known per se experiences a rotary drive, brings clear advantages with regard to improved repeatability of the desired adjustment travel. Precision adjusting device here means adjusting devices in which a single commanded step comprises a step size of the spindle or the spindle nut or of the element driven or moved by the adjusting device less than 50 nm, and particularly preferably between 10 and 30 nm.

Claim 1 describes a spindle nut according to the invention, wherein the subsequent subclaims describe at least expedient further developments.

The term "essentially" which is used in the entire following part of the description in connection with the specification of geometric data such as angles, dimensions, positions, orientations or directions is to be understood such that the corresponding geometric data is a deviation of +/−5% compared to the given geometric data, wherein this deviation is due to manufacturing or assembly tolerances, for example.

The spindle nut according to the invention, which can be brought into engagement with a corresponding spindle or is in engagement therewith, comprises an internal thread, which is interrupted or divided by three longitudinal grooves which are equally spaced apart from each other with respect to the circumference, wherein the grooves extend in direction which is directed parallel to a central thread axis A of the spindle nut. As a result, three mutually spaced internal thread segments are formed in the spindle nut. In case that the spindle nut is in engagement with the spindle, the external thread of the spindle is exclusively in contact with the internal thread segments, wherein the spindle nut, with respect to a cross section arranged perpendicular to its central thread axis A, comprises a cross section geometry with an internal cross-section curve K facing the central thread axis. At least the internal thread segments each form a partial circle section of this cross-section curve K, wherein the diameter of each partial circle section correspond to the core diameter of the internal thread.

A partial circle section and an adjacent longitudinal groove section of the cross-section curve K formed by the longitudinal grooves are connected to one another by means of a transition section of the cross section curve K. A distance a between the two transition sections adjoining a same longitudinal groove section is smaller than a distance b between the two transition sections adjoining a same partial circle section.

The spindle nut according to the invention addresses the problem that there is generally a radial clearance of a few micrometers between the spindle nut and the spindle. Particularly when using a conventional spindle nut in a high-precision adjusting device, even a very small radial play can be disruptive.

In case that the spindle nut and spindle are rotated against each other or in case that the load on the spindle changes, the spindle and spindle nut move relative to each other. This happens mainly in the plane perpendicular to the thread axis, but usually an axial displacement along the thread axis is also effected. These parasitic movements come to an end when the forces acting on the spindle and/or the spindle nut are no longer sufficient to overcome the friction at three contact points or contact areas between the spindle and the spindle nut. There are three points of contact or areas of contact, because three points or areas which cannot take a moment are necessary to fix an object in space.

Without the inventive form of the spindle nut, the three contact points or contact areas move continuously along the entire thread area, depending on the load and movement.

Due to the shape of the spindle nut according to the invention with triple division or interruption of its internal thread, the contact points or contact areas can no longer move continuously, but are bound to discrete areas. This improves the positional stability of an adjustment device with such a spindle nut, particularly in the case of small load fluctuations, and the position repeatability of a corresponding adjustment device is considerably increased.

It may be advantageous that each transition section corresponds to a point of discontinuity in the inner cross section curve K.

It may also be advantageous that a line which tangentially contacts a longitudinal groove section in the region of a transition section of the inner cross section curve K, and a line which tangentially contacts a partial circle section which is located immediately adjacent the same longitudinal groove section in the area of the same transition section of the inner cross section curve K, enclose an angle α between them, which lies between 100° and 170°, and preferably between 130° and 160°.

Furthermore, it can be advantageous that each of the longitudinal groove sections of the inner cross section curve does not describe a partial circle, wherein each partial circle comprises the same diameter, and the ratio of the diameter of each partial circle to the core diameter lies between 0.5 and 0.1, and preferably amounts to 0.25.

It may also be advantageous that the area of the overlap between the spindle and the internal threaded segments is larger than the area of the overlap between the spindle and the longitudinal grooves of the spindle nut.

The invention also relates to the use of the spindle nut described above in a motorized adjustment device, preferably in a high-precision motorized adjustment device with step sizes smaller than 50 nm, and particularly preferably with step sizes between 10 and 30 nm.

In the following an embodiment of the invention is described with reference to the accompanying figures.

Figure 2:
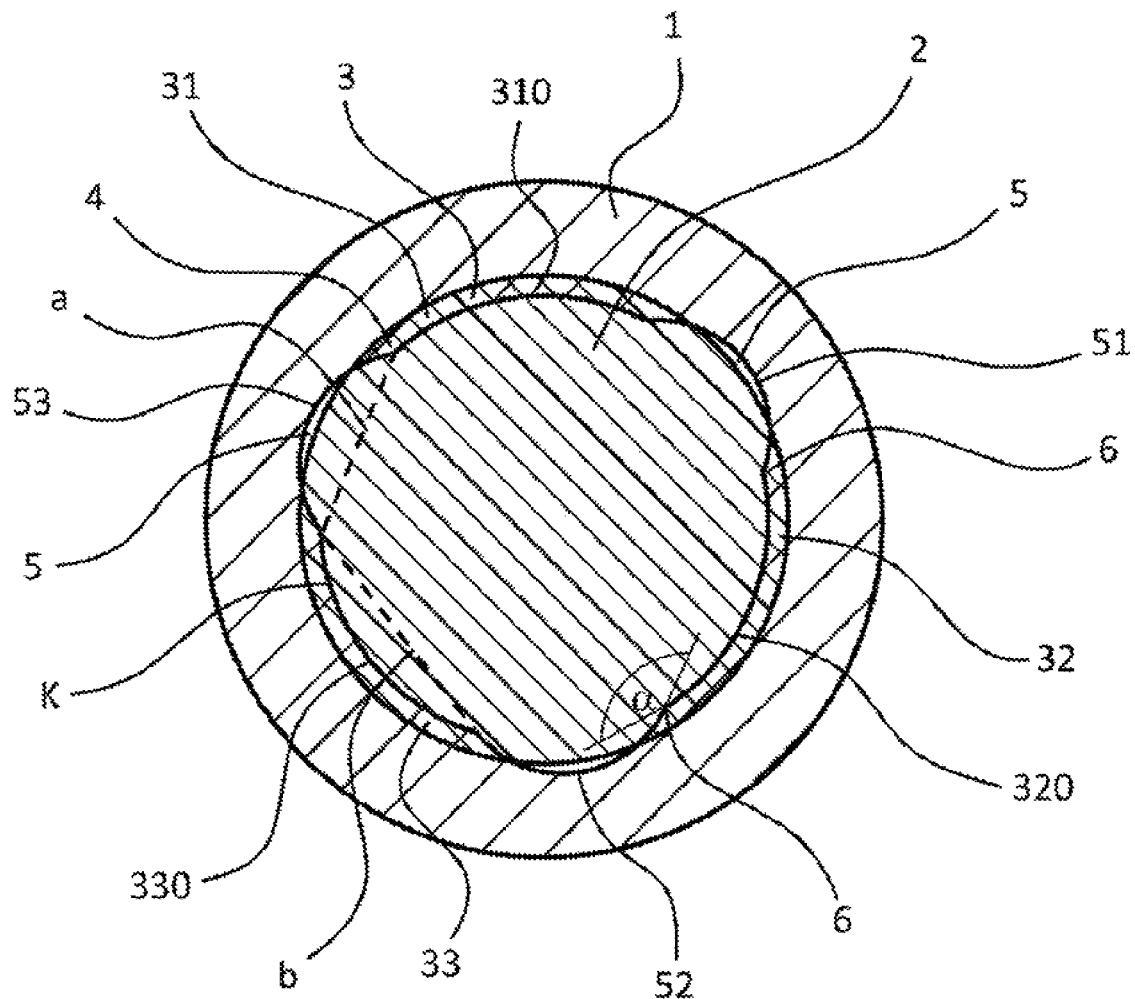

The figures show:

FIG. 1 a perspective view of a spindle nut according to the invention in engagement with a corresponding spindle FIG. 2 a cross section representation with respect to the arrangement of the spindle nut-spindle according to FIG. 1

FIG. 1 shows a perspective view of a wire model of a spindle nut 1 according to the invention, which is in engagement with a corresponding spindle 2, wherein the spindle 2 is formed spherical or partially spherical at one of its two distal ends (the distal end of the spindle 2 which is located on the left side of FIG. 1).

The spindle nut 1 comprises a central thread axis A, which coincides with a central thread axis of the spindle. The spindle 2 has a continuous and uninterrupted external thread 4, while the spindle nut comprises an internal thread 3 which is interrupted by three longitudinal grooves 5 which are equally spaced from one another with respect to the circumference of the spindle nut. The longitudinal grooves 5 extend in the longitudinal direction of the spindle nut 1, essentially parallel to the central thread axis 1.

Viewed in the cross section, the longitudinal grooves 5 have a partial circle geometry. In the area of the longitudinal grooves 5 there is no engagement of the external thread of the spindle 2 with the spindle nut 1, while otherwise there is an engagement between the external thread 4 of the spindle 2 and the internal thread 3 of the spindle nut 1. The area of the overlap between the spindle 1 and the internal thread segments 31, 32, 33 is larger than the area of the overlap between the spindle 1 and the longitudinal grooves 5 of the spindle nut 2.

FIG. 2 shows a cross section which is arranged perpendicularly with respect to the central thread axis A with respect to the engagement arrangement of the spindle nut 1 according to the invention with a spindle 2 according to FIG. 1. With reference to FIG. 2, it can be seen more clearly than from FIG. 1 that the internal thread 3 of the spindle nut 1 comprises three recesses which are equally distributed over the circumference of the spindle nut and which are formed by the longitudinal grooves 5. By the longitudinal grooves 5 the internal thread 3 of the spindle nut 1 comprises interruptions, as a result of which three internal thread segments 31, 32, 33 which are spaced apart from one another with respect to the circumference are exist. The uninterrupted or continuous external thread 4 of the spindle 2 is only engaged with the internal thread segments 31, 32, 33 of the spindle nut 1, while in the area of the longitudinal grooves 5 there is no engagement or is not possible due to the lack of an internal thread of the spindle nut.

With regard to the cross-section shown in FIG. 2, arranged perpendicular to its central thread axis A, the spindle nut 1 comprises a cross section geometry with an inner cross section curve K which faces the central thread axis, wherein at least the internal threaded segments 31, 32, 33 each comprise a partial circle section 310, 320, 330 of the cross section curve K form. The diameter of each partial circle section 310, 320, 330 corresponds to the core diameter of the internal thread 3, wherein the partial circle sections 310, 320, 330 of the cross section curve K are connected to longitudinal-groove sections 51, 52, 53 of the cross-section curve K formed by the longitudinal grooves 5 by transition sections 6. The longitudinal groove sections 51, 52, 53 of the inner cross section curve K each describe a partial circle with an identical diameter.

Each of the transition sections 6 represents a point of discontinuity of the inner cross section curve K, i.e. the cross section curve comprises an edge at the transition sections 6. A distance a between the two transition sections 6 which adjoin the same longitudinal groove section 51, 52, 53 is smaller than a distance b between both transition sections 6 which adjoin the same partial circle section 310, 320, 330.

In FIG. 2, two lines are drawn in the area of a transition section 6, wherein each line represents an extension in the tangential direction of the longitudinal groove section 52 or partial circle section 320 which adjoin the transition section 6, and wherein the corresponding two lines enclose an angle α between them. In other words, a line which tangentially contacts the longitudinal groove section 52 in the region of the corresponding transition section 6 of the inner cross section curve K and a line which tangentially contacts a partial circle section 320 which lies immediately adjacent to the same longitudinal groove section 52 in the region of the same transition section 6 of the inner cross-section curve K include an angle α between them. This angle α is between 100° and 170°, and preferably between 130° and 160°.

The function or mode of action of the spindle nut according to the invention is described below.

In case that the external thread of a spindle engages with the internal thread of a corresponding spindle nut, it is practically unavoidable that a certain amount of play is present. When the spindle and spindle nut are braced in the axial direction, locally different compressive stresses result on the flanks of the thread which contact each other. Despite these compressive stresses under axial preload, even small forces perpendicular to the axial direction are sufficient that the spindle and the spindle nut move relative to one another due to the inevitable play between the spindle and the spindle nut. With the corresponding small relative movements, the areas of higher pressure load move or shift over the entire thread circumference on essentially continuous paths.

In the spindle nut according to the invention with its internal thread interrupted by three longitudinal grooves, the above-mentioned continuous paths are interrupted, as a result of which the areas with higher pressure loads can no longer be shifted continuously, and the areas with low or even no local pressure loads are located within the thread interruptions. A migration or a shift of the areas of higher pressure load by forces acting laterally or perpendicular to the axial direction is effectively reduced or even completely prevented. Overall, this results in a very high positional stability of the arrangement spindle-spindle nut against transverse forces.

But by the provision of corresponding longitudinal grooves in the internal thread of the spindle nut according to the invention not only statically a technical advantage results, but also in dynamic load cases, for example when using a spindle-spindle nut combination for adjustment devices or in positioning applications.

As already mentioned above, for technical reasons there is always a certain geometric difference between the circumference of a surface or the outer face of the spindle and the circumference of the corresponding inner surface of an associated spindle nut. Specifically, the circumference of the outer surface of the spindle is slightly smaller than the circumference of the inner surface of the spindle nut. As also described above, compressive stresses are formed under a pretension in the axial direction in the thread engagement area, wherein the compressive stresses in some cases which locally and, when viewed in particular over the circumference, partially considerably differ from each other.

When, with a spindle-spindle nut combination known from the prior art which in each case comprise an uninterrupted or continuous thread, the spindle is now rotated for the purposes of a positioning/adjustment, the regions with locally different compressive stresses migrate or shift on steady paths over the whole thread circumference. The result is a parasitic movement in which the outer circumference of the spindle operates against the inner circumference of the spindle nut, and a rotation of the spindle axis about the axis of the spindle nut on a path which is circle-similar occurs, the maximum path diameter of which corresponds to the difference between the spindle nut inside diameter and the outside spindle diameter. Due to this parasitic movement, the repeatability of an axial adjustment path decreases in relation to the commanded angle of rotation.

When using a spindle nut according to the invention with three thread interruptions together with a conventional spindle with a continuous thread, the continuous paths, on which, in the spindle-spindle nut combination known from the prior art, the regions with locally different compressive stresses can shift, are interrupted, so that a constant shifting of the compressive stresses is no longer possible, and the areas with little or no local compressive stress are located on the three thread interruptions of the spindle nut. This in particular prevents the formation of a resonant oscillation with respect to the parasitic movement described above, because the necessary conditions for oscillation to resonate are too different between the continuous and interrupted thread areas. Thus, the spindle nut according to the invention also ensures a significantly improved repeatability of the axial adjustment path in relation to a commanded rotation angle, even in dynamic load cases—in particular when using a corresponding spindle-spindle nut combination for adjustment devices.

REFERENCE LIST 1 spindle nut
2 spindle
3 internal thread (of spindle nut)
4 external thread (of spindle)
5 longitudinal groove (of spindle nut)
6 transition section
31, 32, 33 internal thread segments (of spindle nut)
51, 52, 53 longitudinal groove sections (of cross-section curve K)
310, 320, 330 partial circle shaped section (of cross-section curve K)

The invention claimed is:

1. A spindle nut and spindle assembly for use with an adjustment device, wherein:
   the spindle nut comprises:
      an internal thread which is defined by three longitudinal grooves, which run in a direction parallel to a central thread axis A of the spindle nut, which is interrupted by three spaced-apart internal thread segments formed in the spindle nut, and when the spindle nut is in engagement with a spindle, an external thread of the spindle is in contact only with the internal thread segments;
      wherein the spindle nut, with respect to a cross section arranged perpendicular to its central thread axis A, comprises a cross section geometry including an inner cross-section curve K facing the central thread axis;
      wherein at least inner thread segments each form a partial circle shaped section of the cross-section curve K;
      wherein a diameter of each partial circle shaped section corresponds to a core diameter of the internal thread, and the partial circle shaped sections of the cross-section curve K are connected via transition sections to longitudinal groove sections of the cross section curve K which are formed by the longitudinal grooves; and
      wherein a distance a between two transition sections adjoining a longitudinal groove section is smaller than a distance b between two transition sections which adjoin a partial circle shaped section; and
   the spindle comprises a continuous thread;
   wherein the three longitudinal grooves of the spindle nut create three discontinuities between the three spaced-apart internal thread segments of the spindle nut; and
   wherein the three discontinuities are shaped to keep the spindle nut from pressing against the continuous threads of the spindle along the grooves, thereby minimizing movement of the spindle within the spindle nut by interrupting the continuity of the compressive stresses that form along the continuous threads of the spindle that cause the spindle to move within the spindle nut during use; and
   wherein the circumference of the inner surface of the spindle nut along the internal thread is slightly larger than the outer surface of the spindle in order to provide an amount of play between the spindle nut and the spindle.

2. The spindle nut and spindle assembly according to claim 1, wherein each transition section corresponds to a point of discontinuity of the inner cross-section curve K.

3. The spindle nut and spindle assembly according to claim 2, wherein a line which tangentially touches a longitudinal groove section in a region of a transition section of the inner cross-section curve K, and a line which tangentially touches a partial circle shaped section which is located immediately adjacent to the same longitudinal groove section in an area of the same transition section of the inner cross-section curve K, enclose an angle a between themselves which lies between 100° and 170°.

4. The spindle nut and spindle assembly according to claim 3, wherein the angle a is between 130° and 160°, inclusive.

5. The spindle nut and spindle assembly according to claim 2, wherein each of the longitudinal groove sections of the inner cross-section curve K describes a partial circle, wherein each partial circle comprises the same diameter, and wherein a ratio of the diameter of each partial circle to the core diameter is between 0.5 and 0.1.

6. The spindle nut and spindle assembly according to claim 5, wherein the ratio of the diameter of each partial circle to the core diameter is 0.25.

7. The spindle nut and spindle assembly according to claim 2, wherein an area of an overlap between the spindle and the internal thread segments is larger than an area of the overlap between the spindle and the longitudinal grooves of the spindle nut.

8. Use of the spindle nut and spindle assembly according to claim 2 in a motorized adjustment device or high-precision motorized adjustment device.

9. The spindle nut and spindle assembly according to claim 1, wherein a line which tangentially touches a longitudinal groove section in a region of a transition section of the inner cross-section curve K, and a line which tangentially touches a partial circle shaped section which is located immediately adjacent to the same longitudinal groove section in an area of the same transition section of the inner cross-section curve K, enclose an angle a between themselves which lies between 100° and 170°.

10. The spindle nut and spindle assembly according to claim 9, wherein the angle a is between 130° and 160°, inclusive.

11. The spindle nut and spindle assembly according to claim 1, wherein each of the longitudinal groove sections of the inner cross-section curve K describes a partial circle, wherein each partial circle comprises the same diameter, and wherein a ratio of the diameter of each partial circle to the core diameter is between 0.5 and 0.1.

12. The spindle nut and spindle assembly according to claim 11, wherein the ratio of the diameter of each partial circle to the core diameter is 0.25.

13. The spindle nut and spindle assembly according to claim 1, wherein an area of an overlap between the spindle and the internal thread segments is larger than an area of an overlap between the spindle and the longitudinal grooves of the spindle nut.

14. Use of the spindle nut and spindle assembly according to claim 1 in a motorized adjustment device or high-precision motorized adjustment device.

15. The spindle nut and spindle assembly according to claim 1,
wherein the three discontinuities minimize movement of the spindle nut with respect to the spindle without bending of the internal threads as a beam to expand radially outwardly when accommodating the threads on the spindle.

16. The spindle nut and spindle assembly according to claim 15,
wherein the three discontinuities having an angle of change of between about 130° and 160° when going from the internal thread segments to the grooves and vice-versa, the angle of change minimizing the formation of resonant oscillation created by parasitic movement of the spindle with respect to the spindle nut under dynamic conditions.

17. A spindle nut and spindle assembly for use with an adjustment device, wherein:
the spindle nut comprises:
an internal thread which is defined by three longitudinal grooves, which run in a direction parallel to a central thread axis A of the spindle nut, which is interrupted by three spaced-apart internal thread segments formed in the spindle nut, and when the spindle nut is in engagement with the spindle, an external thread of the spindle is in contact only with the internal thread segments;
wherein the spindle nut, with respect to a cross section arranged perpendicular to its central thread axis A, comprises a cross section geometry including an inner cross-section curve K facing the central thread axis;
wherein at least inner thread segments each form a partial circle shaped section of the cross-section curve K;
wherein a diameter of each partial circle shaped section corresponds to a core diameter of the internal thread, and the partial circle shaped sections of the cross-section curve K are connected via transition sections to longitudinal groove sections of the cross section curve K which are formed by the longitudinal grooves; and
wherein a distance a between two transition sections adjoining a longitudinal groove section is smaller than a distance b between two transition sections which adjoin a partial circle shaped section; and
the spindle comprises a continuous thread;
wherein the three longitudinal grooves of the spindle nut create three discontinuities between the three spaced-apart internal thread segments of the spindle nut; and
wherein the three discontinuities are shaped to keep the spindle nut from pressing against the continuous threads of the spindle along the grooves, thereby minimizing movement of the spindle within the spindle nut by interrupting the continuity of the compressive stresses that form along the continuous threads of the spindle that cause the spindle to move within the spindle nut during use; and
wherein the spindle and nut maintain a radial clearance between the spindle nut and the spindle when the spindle nut is in engagement with the spindle.

18. The spindle nut and spindle assembly according to claim 17, wherein the radial clearance between the spindle nut and the spindle is a few micrometers.

* * * * *